Sept. 6, 1966 H. E. WEGNER 3,270,620
MACHINE FOR SHAVING EMBOSSED LETTERS ON BOTTLE CLOSURES
Filed April 20, 1965 4 Sheets-Sheet 1

INVENTOR.
HERMAN E. WEGNER
BY
Herbert E. Kidder
AGENT

INVENTOR.
HERMAN E. WEGNER
BY
Herbert E. Kidder
AGENT

Sept. 6, 1966  H. E. WEGNER  3,270,620
MACHINE FOR SHAVING EMBOSSED LETTERS ON BOTTLE CLOSURES
Filed April 20, 1965  4 Sheets-Sheet 3

INVENTOR.
HERMAN E. WEGNER
BY
Herbert E. Kidder
AGENT

INVENTOR.
HERMAN E. WEGNER
BY
Herbert E. Kidder
AGENT

United States Patent Office 3,270,620
Patented Sept. 6, 1966

3,270,620
MACHINE FOR SHAVING EMBOSSED LETTERS ON BOTTLE CLOSURES
Herman E. Wegner, Riverside, Calif., assignor, by mesne assignments, to Alcan Aluminum Corporation, New York, N.Y., a corporation of New York
Filed Apr. 20, 1965, Ser. No. 449,573
11 Claims. (Cl. 90—15)

The present invention relates generally to bottle cap forming machines, and more particularly, to a machine for shaving the paint and a very thin layer of metal from raised lettering embossed on the sides of the bottle cap, thereby exposing the shiny metal so that the lettering stands out in bold contrast to the painted cap.

These bottle caps are usually produced on high-speed production lines consisting of rotary cap machines, in which caps that have been previously drawn and formed from painted aluminum strip, are successively loaded onto first one and then another of the rotary cap machines, where the embossing and forming operations are performed as the machine turns between its loading and unloading stations. One of the steps performed on some of the bottle caps that are widely used on liquor and wine bottles, is to take a fine shaving cut off the top surface of the raised letters. Heretofore, there have been two principal methods of shaving the caps:

(1) Using a tube shaver, which is a tubular cutting tool that is pushed down over the cap mounted on its supporting chuck; and (2) Using a rotary planer, in which the cap chucked on a spinning mandrel is momentarily engaged by a rotary high speed planing tool.

Both of these methods have certain disadvantages. The tube shaver is fast, but the quality of finished work produced is seriously affected by any minute variation of the outside diameter of the embossed letters, eccentricity of the cap, and dullness of the cutting edge. Also, tool life is rather short, owing to wear on the inside surface of the tubular tool, and any slight change in the outside diameter of the cap necessitates using new tools. The rotary planer, on the other hand, produces a very high quality shaved surface which is uniform in appearance all the way around the cap, and can be adjusted to accommodate any variation in the outside diameter of the cap. However, it has one serious drawback, being rather slow, owing to the loading time and the pause to shave. As a result, the maximum production is somewhere in the neighborhood of 100 caps per minute, whereas the rest of the cap line works at the rate of 400 caps per minute.

The primary object of the present invention is to provide a cap shaving machine which produces a shaved cap surface of superior quality, and at a high rate of speed commensurate with the cap production speed of the preceding cap line units.

Another important object of the invention is to provide a machine of the class described, wherein the cap-shaving operation is performed while the cap is revolving with the spindle carrier, and without pausing momentarily during the shaving operation, as in the case of prior machines.

Another object of the invention is to provide a cap-shaving machine having a longer tool life than previous machines, with a corresponding reduction of shut-down time for the cap line while tools are being sharpened or replaced.

A further object of the invention is to provide a machine which shaves the caps cleanly, without staining or smearing the finished surface, and wherein the cutter is self-cleaning.

Still another object of the invention is to provide a cap shaving machine in which the depth of shaving cut may be quickly and easily adjusted, and which is virtually unaffected by cap eccentricity or variation in the outside diameter of the cap.

These and other objects and advantages of the invention will become apparent to those skilled in the art, from the following detailed description of the preferred embodiment thereof, reference being had to the accompanying drawings, wherein:

FIGURE 7 is an enlarged fragmentary sectional view, taken at 7—7 in FIGURE 1; and FIGURE 8 is a fragmentary view taken at 8—8 in FIGURE 7.

Figure 1:
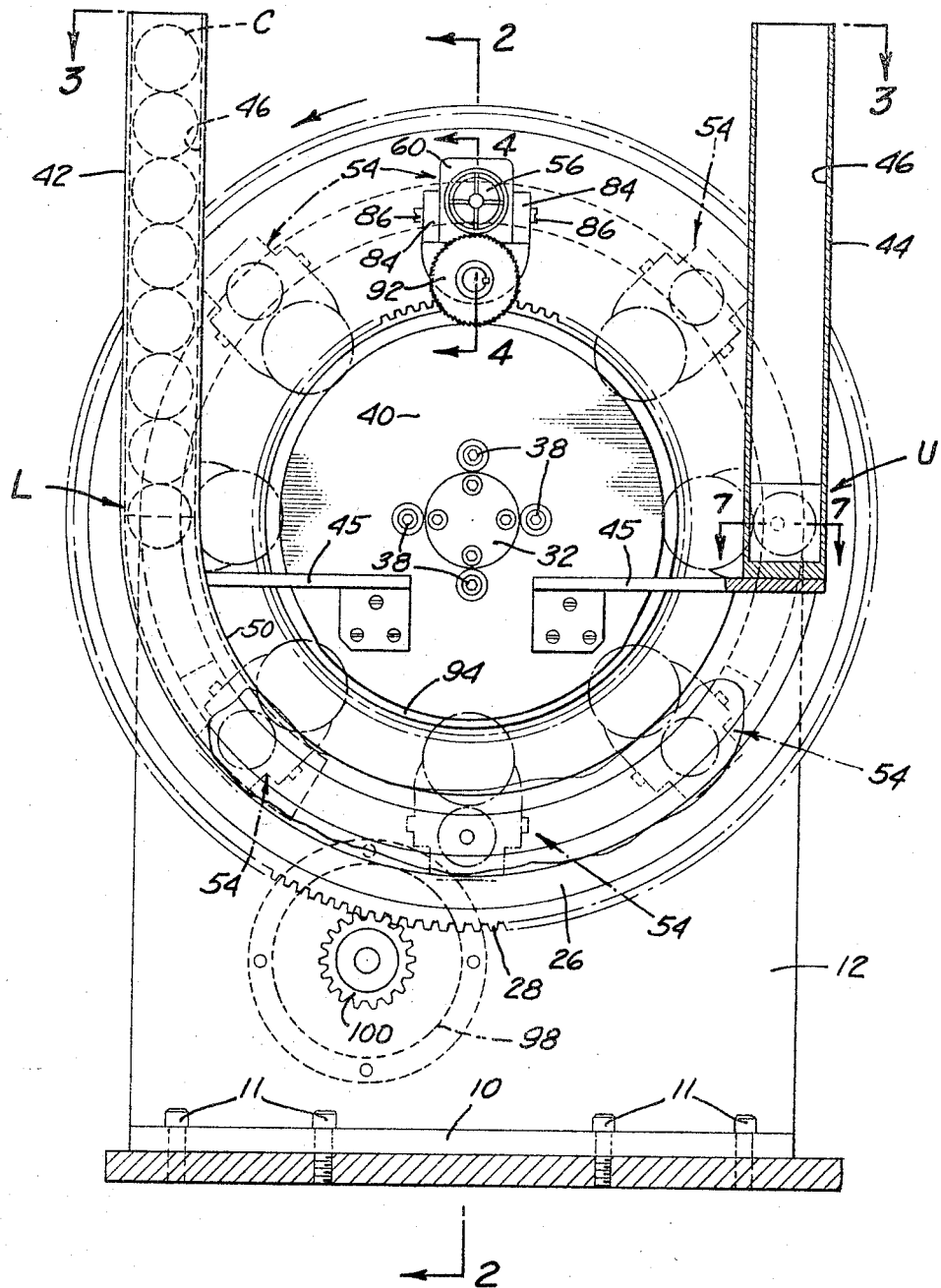
FIGURE 1 is a front elevation of a cap shaving machine embodying the principles of the invention, showing an eight-spindle machine, of which only one of the spindles is depicted in solid lines, the others being indicated in phantom lines.
Figure 2:
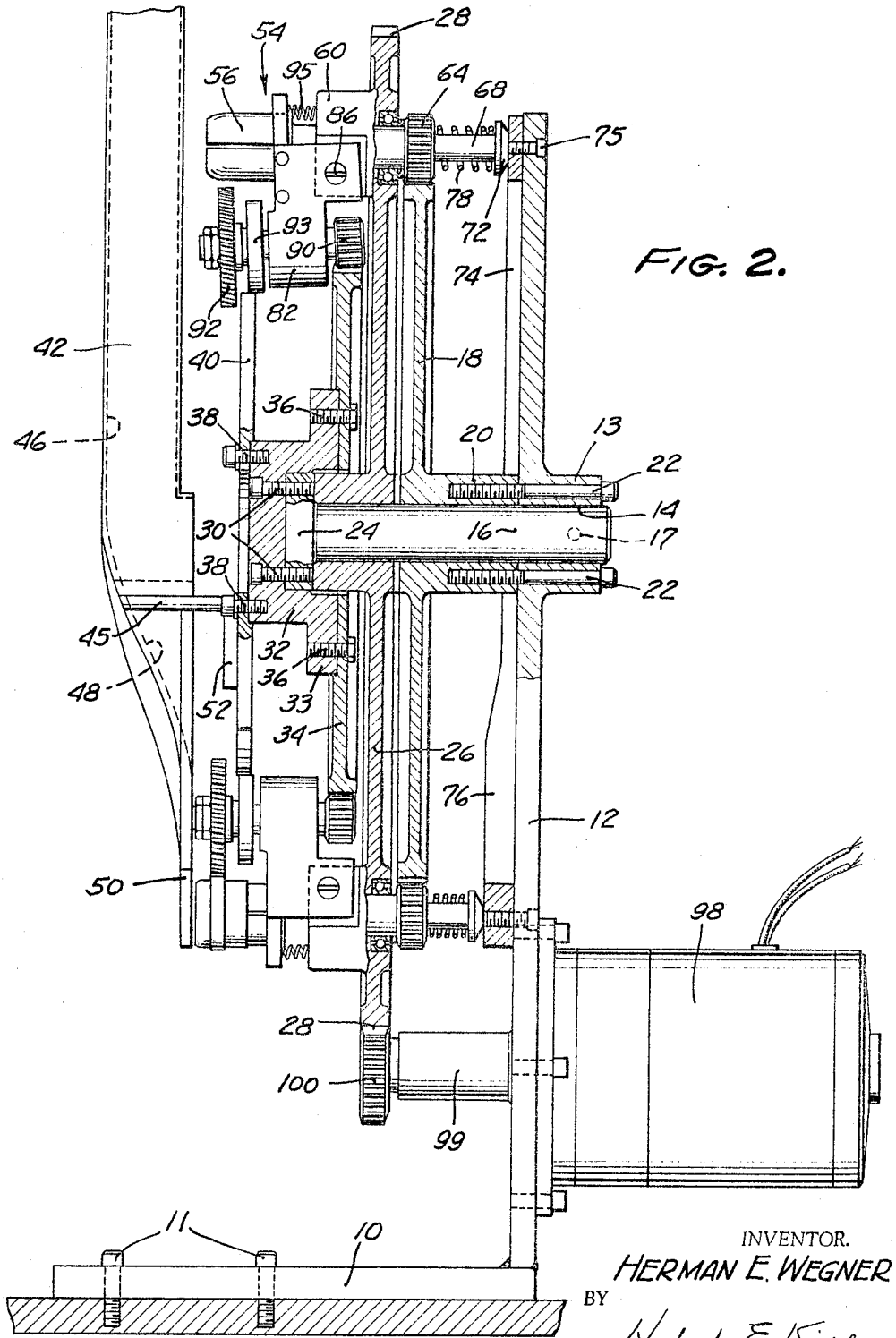
FIGURE 2 is a cross-sectional view of the same, taken at 2—2 in FIGURE 1, with only two of the spindles being shown, in the interests of clarity.
Figure 3:
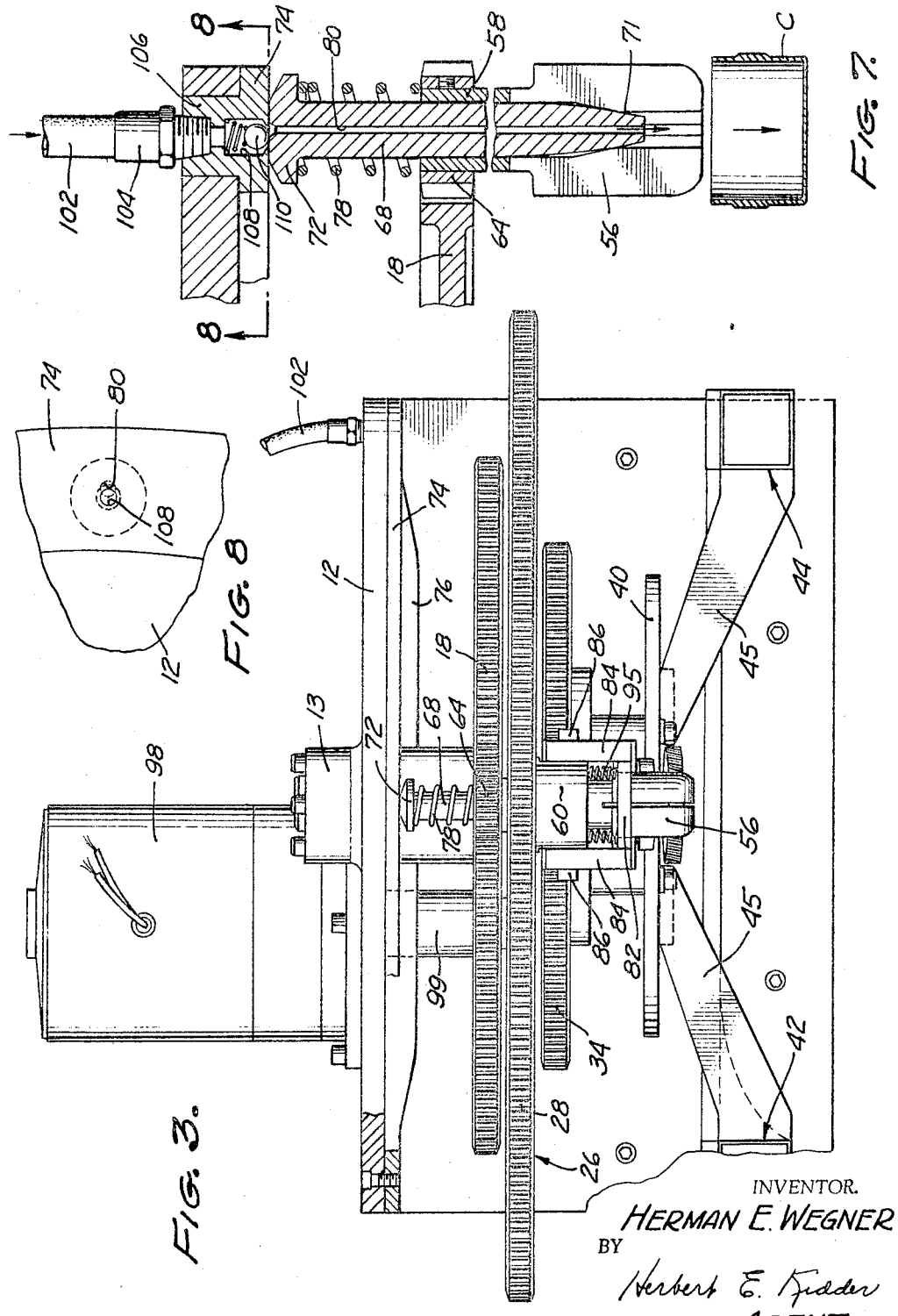
FIGURE 3 is a top plan view of the machine as seen at 3—3 in FIGURE 1, again showing only one of the eight spindles.

The cap shaving machine of the present invention comprises a base plate 10 which is secured by screws 11 to a work table or other supporting surface. Welded to the back edge of the base plate and rising perpendicularly therefrom is a back plate 12 having a boss 13 projecting rearwardly from the back side thereof. The boss 13 is bored at 14, and seated within this bore is a stub shaft 16 which is secured against turning by a pin 17. The shaft 16 projects from the front side of the plate 12, and provides a mount for a stationary gear 18 having a hub 20 secured by screws 22, which extend through the bosses 13. The projected end of the shaft 16 has an enlarged head 24, and journaled on the shaft 16 between the head 24 and the hub 20 of stationary gear 18, is a rotatable spindle carrier 26. Gear teeth 28 are formed in the peripheral edge of the carrier 26.

Seated on the shaft head 24 and secured thereto by screws 30, is a generally cup-shaped member 32 having a radial flange 33. A stationary gear 34 is mounted on the inside face of the flange 33 and is secured thereto by screws 36. Attached to the outer face of the member 32 by screws 38 is a generally circular cam plate 40. Mounted on the cam plate 40, at opposite sides thereof, are a loading chute 42 and unloading chute 44.

Both the loading chute 42 and unloading chute 44 are generally square-shaped tubes extending vertically from supporting brackets 45, each of which is secured to the cam plate 40 substantially as shown. The interior 46 of said tubes is dimensioned to receive the caps C one on top of the other with their open ends facing toward the machine.

At the lower end of the loading chute 42 is an inclined ramp 48 which terminates in an arcuately curved plate 50 having its center of curvature at the axis of the shaft 16. The side of the loading chute facing toward the machine is open from a point level with the shaft 16, and as the caps slide downwardly along the inclined ramp surface 48, they are cammed inwardly toward the face of the carrier 26, where they are picked up on spindles 54 as the spindle carrier rotates. A release mechanism (not shown), within the chute 42, releases the caps C one at a time as the spindles 54 come around to the loading station. The cap is picked up on a spindle, and is pressed onto the spindle chuck by the curved plate 50, which overlies the ends of the spindles and conforms with the circular travel path of the spindles as they revolve with the carrier.

Each of the spindles 54 consists of an expanding chuck 56 which is formed integrally with the tubular shaft 58 at one end thereof. The shaft 58 extends through a bore 59 in a boss 60 formed on the front face of a rotatable spindle carrier 26, and the shaft is journaled in the bearings 62 and 63. The other end of the tubular shaft 58 projects from the back side of the carrier 26, and mounted on the projecting end thereof is a pinion 64 which meshes with the teeth of the stationary gear 18.

Figure 4:
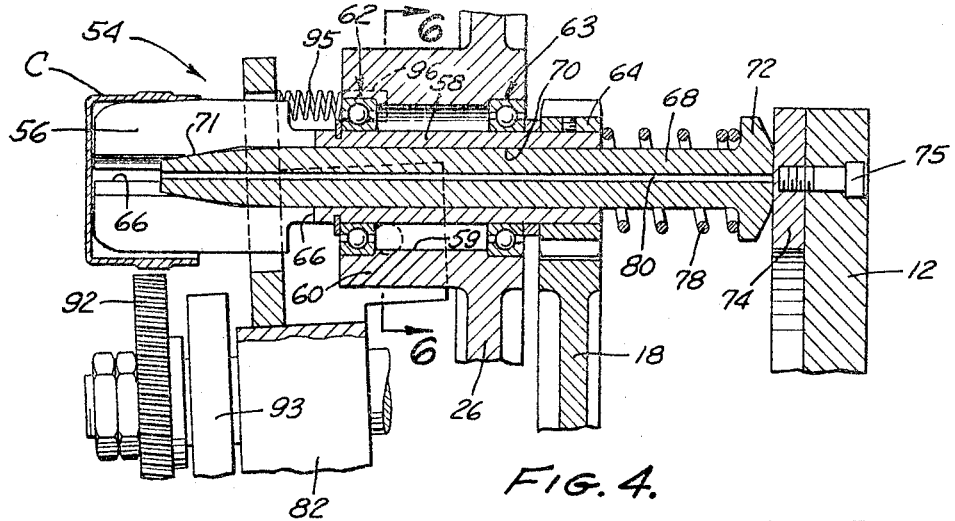
FIGURE 4 is an enlarged fragmentary sectional view, taken at 4—4 in FIGURE 1, showing the expanding mandrel in the contracted condition, with the shaving cutter retracted from the raised lettering on the cap.
Figure 5:
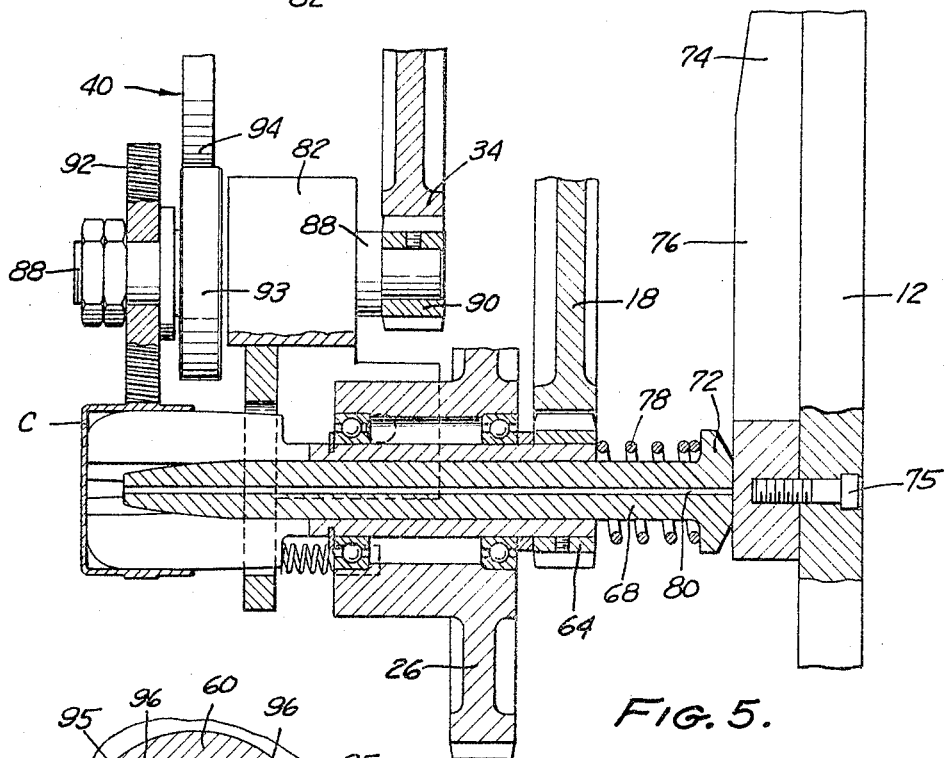
FIGURE 5 is a view similar to FIGURE 4, showing the spindle at a further advanced stage in the rotation of the machine, with the mandrel full expanded in contact with the interior of the cap, and the shaving cutter in cutting engagement with the raised lettering on the cap.
Figure 6:
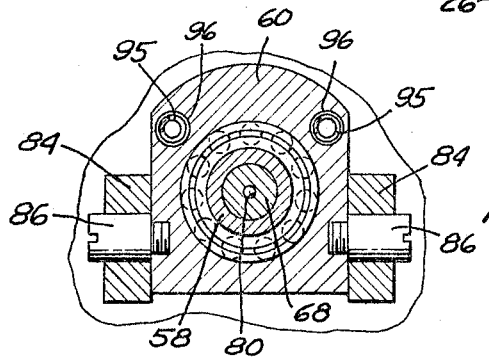
FIGURE 6 is a sectional view taken at 6—6 in FIGURE 4.

The expanding chuck 56 is slotted diametrically at 66 for a distance in from the end, and these slots permit the sectors of the chuck to flex inwardly or outwardly responsive to a tapered mandrel 68, that is slidably disposed within a bore 70 in the shaft 58. One end of the mandrel 68 is tapered at 71, and when the mandrel is pushed inwardly, or to the left as seen in FIGURES 4 and 5, the chuck 56 is expanded to grip the cap C tightly internally thereof.

The other end of the mandrel 68 projects beyond the end of the shaft 58, and is provided with a rounded head 72, which rides on an annular cam 74. The cam 74 is concentric with the shaft 16, and is secured to the back plate 12 by screws 75. The lower portion of the cam 74 for about 50 degrees on either side of the vertical dropped from the center of the shaft 16, provided with an elevated lift portion 76, over which the mandrel head 72 rides as the spindle carrier rotates. When the head 72 rides up on the cam lift 76, the mandrel 68 is pushed inwardly or to the left, as viewed in FIGURE 5, thereby expanding the chuck 56. As the mandrel head rides down off the elevated lift portion 76, the mandrel is retracted by a spring 78, causing the chuck 56 to contact. The mandrel 68 also has a central air pasageway 80, the purpose of which is set forth below.

Pivotally mounted on the boss 60 is a cutter support 82. The cutter support 82 has a pair of laterally spaced arms 84 which extend on either side of the boss 60, and these are apertured to receive axially aligned pivot pins 86 which are screwed into opposite sides of the boss.

Journaled within a bearing in the cutter support 82 is a shaft 88, one end of which projects rearwardly from the boss and is stepped down in diameter to receive a small pinion 90 that meshes with the teeth of stationary gear 34. The other end of the shaft 88 projects forwardly from the cutter support 82, and non-rotatably mounted thereon is a milling cutter 92. A cam follower wheel 93 is journaled on the shaft 88 between the cutter support 82 and milling cutter 92, and this cam follower wheel rides on the outer periphery of the circular cam plate 40. The bottom portion of the cam plate 40 is provided with a slightly raised cam lobe 94, and as the wheel rides up on this lobe, the cutter support 82 is rocked about the pivot pins 86, causing the milling cutter 92 to engage the raised lettering on the sides of the caps C, so as to take a thin shaving cut on the same. Two compression springs 95 seated within cylindrical cavities 96 in the boss 60, press against the cutter support 82, yieldingly holding the wheel 93 against the cam plate 43.

Driving power for the machine is provided by an electric motor 98, which is mounted on the back side of the plate 12. The drive shaft of the motor 98 projects forwardly through a boss 99 on the front side of the plate 12, and fixed to the outer end of the shaft is a pinion 100, which meshes with gear teeth 28 on the spindle carrier 26. As the motor 98 drives the spindle carrier 26, pinion 64 on the tubular shaft 58 is caused to rotate by virtue of its engagement with the stationary gear 18. This causes the chuck 56 with its cap C to rotate at a fairly high rate of speed as the spindle carrier 26 revolves. On the opposite side of the spindle carrier 26, pinion 90 is caused to rotate by virtue of its engagement with the teeth of stationary gear 34, and this drives the milling cutter 92. As seen in FIGURE 1, the spindle carrier 26 is driven in the counter-clockwise direction, and this causes the milling cutter 92 and chuck 46 to turn also in the counter-clockwise direction. With the milling cutter 92 and the chuck 46 disposed in tangential relation, as shown, at the point of contact their surfaces move in opposite directions. Thus contact between the surface of cap C and the cutter 92 is made at a speed equal to the sum of their individual speeds, resulting in a clean and rapid milling action.

In FIGURE 1, the loading and unloading stations are designated at L and U, respectively. As the spindles 54 move down past the loading station L, the caps C are released one at a time from the chute 42 by the usual cap-feeding mechanism (not shown) which is old and well-known in the art, and need not be shown in detail or described herein, as such cap-feeding mechanisms are used on all rotary cap machines of this same general type. Upon being released, each cap drops down along the inclined ramp 48, which guides the cap inwardly toward the spindle for which it is intended. The cap is caught on the chuck of the spindle and is carried along thereby as the carrier 26 revolves. The inclined ramp continues to push the cap onto the chuck until it is fully seated, and the cap is thereafter held in place on the chuck by the overlying curved plate 50, while the chuck is expanded tightly against the inner surface of the cap. Next, the milling cutter 92 is moved into shaving contact with the raised lettering on the side of the cap, as the cam follower wheel 93 rides up on the lobe 95. Upon completion of the shaving operation, the milling cutter is retracted away from the cap as the cam follower wheel 93 rides down off the lobe 95. At the same time, the chuck 56 is contracted as the head 72 rides down off the high portion 76 of the cam plate 74. The cap is then ejected from the chuck as the spindle passes through the unloading station U.

Ejection of the cap from the chuck may be accomplished in any of several ways, but in the illustrated embodiment, the caps are merely blown off the contracted chuck 56 by means of an air jet which is blown through the passageway 80. As shown in FIGURE 7, there is an air pressure line 102 connected to a fitting 104 which is screwed into a threaded hole in a projecting boss 106 on the cam 74 opposite the unloading station U. A bore 108 in the cam 74 communicates with the air pressure line 102 and has a spring-loaded ball check 110 which closes a discharge aperture 112 opening through the face of the cam 74. The discharge aperture 112 is slightly offset to one side of the path of the air passageway 80 in the mandrel 68, so that when the ball check 110 is depressed by the mandrel head 72, the ball check 110 will not seat in the end of the air passageway 80, thereby blocking the latter.

As the spindle 54 arrives at the unloading station U, the mandrel head 72 depresses the ball check 110, and a puff of air from the pressure line 102 is blown through the passageway 80, blowing the cap C off the end of the contracted chuck 56 and into the interior of the unloading chute 44. From here, the cap C is propelled, usually by air, to the next machine or to the delivery end of the cap line.

The operation of the invention is believed to be clearly evident from the foregoing description. One of the chief advantages of the invention is that the cap shaving operation takes place while the spindle carrier 26 continues to rotate without interruption, and there is no starting and stopping of the carrier to index the spindles around to a stationary milling cutter, as in prior machines. Another advantageous feature of the invention is that only one motor is required to drive the spindle carrier, the eight spindles, and the eight milling cutters.

The cap shaving machine of the present invention may be synchronized with other rotary cap machines in the production lines, and the shaving operation can be accomplished at the same rate of speed as any other operation performed by other machines in the line. Thus, what has heretofore been a bottleneck in the production of closures of this type, is now reduced to a simple production step that is smoothly integrated into the line of rotary cap machines. Moreover, the quality of finish produced by the machine of the present invention is comparable to the best produced by other machines, without the objectionable slowness of the other machines.

While I have shown and described in considerable detail what I believe to be the preferred form of my invention, it will be understood by those skilled in the art that various changes may be made in the shape and arrangement of the several parts without departing from the broad scope of the invention as defined in the following claims.

I claim:

1. A machine for shaving a thin layer from the surface of raised lettering embossed on the sides of a bottle closure, comprising:
   a continuously rotating spindle carrier having at least one spindle journaled thereon, said spindle having an expanding chuck to receive and hold a bottle closure;
   a loading station, including means for loading closures onto said chuck;
   an unloading station spaced an angular distance from said loading station;
   means for driving said spindle carrier;
   a rotatable milling cutter mounted adjacent said spindle and movable therewith as the spindle revolves with said carrier;
   said milling cutter being movable toward and away from said chuck between a first position wherein the cutter is spaced radially outwardly from a closure mounted on the chuck, so as to clear the same, and a second position wherein the cutter takes a light shaving cut on the surface of said lettering as said closure rotates with said spindle;
   said milling cutter being normally held at said first position as said spindle and chuck pass said loading and unloading stations;
   means for moving said milling cutter from said first position to said second position and then back to said first position as the spindle revolves from said loading station to said unloading station; and
   means for removing the shaved closures from said chuck as the latter passes said unloading station.

2. A machine for shaving a thin layer from the surface of raised lettering embossed on the sides of a bottle closure, comprising:
   a continuously rotating spindle carrier having at least one rotatable spindle journaled thereon, said spindle having an expanding chuck to receive and hold a bottle closure;
   a loading station, including means for loading closures onto said chuck;
   an unloading station spaced an angular distance from said loading station;
   means for driving said spindle carrier;
   a rotatable milling cutter mounted adjacent said spindle and movable therewith as the spindle revolves with said carrier;
   said milling cutter being movable toward and away from said chuck between a first position wherein the cutter is spaced away from a closure mounted on the chuck, so as to clear the same, and a second position wherein the cutter takes a light shaving cut on the surface of said lettering as said closure rotates with said spindle;
   said milling cutter being normally held at said first position as said spindle and chuck pass said loading and unloading station;
   a stationary, generally circular cam mounted concentric with the axis of rotation of said spindle carrier;
   a cam follower on said spindle carrier riding on said stationary cam, said cam follower being connected to said milling cutter and operable to move the latter from said first position to said second position and then back to said first position as said spindle travels from said loading station to said unloading station; and
   means for removing the shaved closures from said chuck as the latter passes said unloading station.

3. A machine for shaving a thin layer from the surface of raised lettering embossed on the sides of a bottle closure, comprising:
   a continuously rotating spindle carrier having at least one rotatable spindle journaled thereon, said spindle having an expanding chuck to receive and hold a bottle closure;
   a loading station, including means for loading closures onto said chuck;
   an unloading station spaced an angular distance from said loading station;
   means for driving said spindle carrier and simultaneously causing said spindle to rotate;
   cutter means operable to take a light shaving cut on the surface of said lettering as said closure rotates with said spindle in traveling from said loading station to said unloading station; and
   means for removing the shaved closures from said chuck as the latter passes said unloading station.

4. A machine as set forth in claim 3, wherein said cutter means comprises a milling cutter mounted on said spindle carrier and movable toward and away from a closure mounted on said chuck; and
   cam means operable to move said milling cutter into position to take a light shaving cut on the surface of said lettering as said closure rotates with said spindle in traveling from said loading station to said unloading station;
   said cam means being operable to retract said milling cutter from said chuck as said spindle approaches said unloading station.

5. A machine for shaving a thin layer from the surface of raised lettering embossed on the sides of a bottle closure, comprising:
   a continuously rotating spindle carrier having at least one rotatable spindle journaled thereon, said spindle having an expanding chuck to receive and hold a bottle closure;
   a loading station, including means for loading closures onto said chuck;
   an unloading station spaced an angular distance from said loading station;
   means for driving said spindle carrier;
   a stationary gear mounted concentric with the axis of rotation of said spindle carrier;
   a pinion mounted on said spindle and meshing with said stationary gear, whereby said spindle is caused to rotate as it revolves with said spindle carrier;
   cutter means operable to take a light shaving cut on the surface of said lettering as said closure rotates with said spindle in traveling from said loading station to said unloading station; and
   means for removing the shaved closures from said chuck as the latter passes said unloading station.

6. A machine as set forth in claim 5, wherein said cutter means comprises a rotatable milling cutter mounted adjacent said spindle and movable therewith as the spindle revolves with said carrier, said milling cutter being movable toward and away from said chuck;
   a second stationary gear mounted concentric with the axis of rotation of said spindle carrier;
   a second pinion connected to said milling cutter and meshing with said secondary gear, whereby said milling cutter is caused to rotate as it revolves with said spindle carrier; and means for causing said milling cutter to move toward said chuck so as to take a light shaving cut on the surface of said raised lettering as said spindle travels from said loading station to said unloading station.

7. A machine as set forth in claim 6, wherein said means for causing said milling cutter to move toward said chuck comprises a stationary, generally circular cam mounted concentric with respect to the axis of rotation of said spindle carrier; and a cam follower connected to said milling cutter and riding on said cam, said cam follower being operable to move said milling cutter into shaving engagement with the raised lettering on said closure as said spindle travels from said loading station to said unloading station, and then to move the said milling cutter away from said lettering as said spindle approaches said unloading station.

8. A machine for shaving a thin layer from the surface of raised lettering embossed on the sides of a bottle closure, comprising:

a continuously rotating spindle carrier having means for driving the same;

first and second stationary gears mounted on opposite sides of said spindle carrier concentric with the axis of rotation thereof, and said second gear being smaller in diameter than said first gear;

a plurality of spindles rotatably supported on said carrier radially outward from the pitch diameter of said first gear, each of said spindles having a pinion mounted on one end thereof which meshes with said first gear, whereby the spindles are caused to rotate as they revolve with said carrier;

each of said spindles having an expanding chuck mounted on its other end to receive and hold a bottle closure;

a loading station, including means for loading closures onto said chucks;

an unloading station spaced an angular distance from said loading station;

a milling cutter support pivotally mounted on said carrier radially inward of each of said spindles;

a rotatable milling cutter journaled on said support and movable therewith between a first position spaced away from said closure so as to clear the same, and a second position wherein the cutter takes a light shaving cut on the surface of said lettering as said closure rotates with said spindle;

another pinion connected to each of said milling cutters and meshing with said second gear, whereby the milling cutters are caused to rotate as they revolve with said carrier;

means for moving said cutter support and milling cutter from said first position to said second position and then back to said first position as each spindle travels from said loading station to said unloading station; and means for removing the shaved closures from each of said chucks as they pass the unloading station.

9. A machine as set forth in claim 8, wherein said means for moving said cutter support and milling cutter between said first and second positions comprises a stationary, generally circular cam mounted concentric with the axis of rotation of said spindle carrier; and a plurality of cam followers riding on said cam, each of said cam followers being connected to one of said milling cutters and operable to move the latter from one of said positions to the other as said cam follower rides over the high and low spots on said cam.

10. A machine as set forth in claim 9, wherein each of said milling cutters is mounted on one end of a shaft, and each of said second pinions is mounted on the other end thereof; and said cam follower comprising a wheel mounted on said shaft adjacent said milling cutter.

11. A machine for shaving a thin layer from the surface of raised lettering embossed on the sides of a bottle closure, comprising:

a continuously rotating spindle carrier having at least one rotatable spindle journaled thereon, said spindle having an expanding chuck on one end thereof to receive and hold a bottle closure;

said spindle having a bore extending through from one end thereof to the other;

a plunger slidably disposed within said bore and projecting from the other end of said spindle, said plunger having a central passageway extending from one end thereof to the other;

means on one end of said plunger cooperating with said expanding chuck to expand the latter when said plunger is shifted in one direction, and to contract the chuck when the plunger is shifted in the other direction;

an annular cam concentric with the axis of rotation of said carrier;

a head on the other end of said plunger riding on said annular cam, said plunger being spring-loaded toward said annular cam;

a loading station, including means for loading closures onto said chuck;

an unloading station spaced an angular distance from said loading station;

said annular cam being operable to shift said plunger in said one direction shortly after said spindle has left said loading station, and to shift said plunger back in said other direction shortly before said spindle reaches and unloading station;

means for causing said spindles to rotate as they revolve with said carrier;

cutter means operable to take a light shaving cut on the surface of said lettering as said closure rotates with said spindle while traveling from said loading station to said unloading station;

an air jet aperture in said annular cam adjacent said unloading station, said jet aperture being connected to a source of air under pressure; and a spring-loaded ball check valve in said air jet aperture; said ball check valve being depressed by said head as the latter passes over said air jet aperture, thereby allowing air to pass through said passageway to blow the shaved closure off said chuck.

No references cited.

WILLIAM W. DYER, JR., *Primary Examiner.*

G. A. DOST, *Assistant Examiner.*